(12) United States Patent
Taillefer (10) Patent No.: US 8,484,175 B2
(45) Date of Patent: *Jul. 9, 2013

(54) MEMORY TRANSACTION GROUPING

(75) Inventor: Martin Taillefer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/043,082

(22) Filed: Mar. 8, 2011

(65) Prior Publication Data

US 2011/0161603 A1 Jun. 30, 2011

Related U.S. Application Data

(63) Continuation of application No. 11/824,379, filed on Jun. 29, 2007, now Pat. No. 7,941,411.

(51) Int. Cl.
*G06F 7/00* (2006.01)
*G06F 17/00* (2006.01)

(52) U.S. Cl.
USPC .......................................... 707/703; 707/704

(58) Field of Classification Search
None
See application file for complete search history.

(56) References Cited

U.S. PATENT DOCUMENTS

| | | | |
|---|---|---|---|
| 5,157,777 A | 10/1992 | Lai et al. | |
| 5,999,987 A | 12/1999 | O'Farrell et al. | |
| 6,085,035 A | 7/2000 | Ungar | |
| 6,105,147 A * | 8/2000 | Molloy | 714/16 |
| 6,138,269 A | 10/2000 | Ball | |
| 6,237,095 B1 | 5/2001 | Curry et al. | 713/178 |
| 6,237,096 B1 | 5/2001 | Bisbee | |
| 6,240,413 B1 * | 5/2001 | Learmont | 707/698 |
| 6,268,850 B1 * | 7/2001 | Ng | 715/866 |
| 6,324,683 B1 | 11/2001 | Fuh et al. | 717/124 |
| 6,493,804 B1 * | 12/2002 | Soltis et al. | 711/152 |
| 6,516,404 B1 | 2/2003 | Arimilli | |
| 6,553,384 B1 | 4/2003 | Frey et al. | |
| 6,654,760 B2 | 11/2003 | Baskins et al. | |
| 6,772,154 B1 * | 8/2004 | Daynes et al. | 1/1 |
| 6,778,651 B1 | 8/2004 | Jost et al. | 379/201.01 |
| 6,807,582 B1 | 10/2004 | Muschenborn | |

(Continued)

FOREIGN PATENT DOCUMENTS

| | | |
|---|---|---|
| GB | 2239334 A | 6/1991 |
| JP | 01-166236 | 6/1989 |

OTHER PUBLICATIONS

Herlihy, et al., "Software Transactional Memory for Dynamic-Sized Data Structures," Date: Jul. 13, 2003-Jul. 16, 2003, pp. 1-10.

(Continued)

*Primary Examiner* — Hung T Vy
*Assistant Examiner* — Tuan A Pham
(74) *Attorney, Agent, or Firm* — L. Alan Collins; Collins & Collins Intellectual, LLC (57) ABSTRACT

Various technologies and techniques are described for providing a transaction grouping feature for use in programs operating under a transactional memory system. The transaction grouping feature is operable to allow transaction groups to be created that contain related transactions. The transaction groups are used to enhance performance and/or operation of the programs. Different locking and versioning mechanisms can be used with different transaction groups. When running transactions, a hardware transactional memory execution mechanism can be used for one transaction group while a software transactional memory execution mechanism used for another transaction group.

11 Claims, 10 Drawing Sheets

U.S. PATENT DOCUMENTS

| | | | |
|---|---|---|---|
| 6,826,757 B2 | 11/2004 | Steele, Jr. et al. | |
| 7,058,954 B1 | 6/2006 | Wollrath et al. | |
| 7,076,784 B1 | 7/2006 | Russell et al. | 719/315 |
| 7,103,597 B2* | 9/2006 | McGoveran | 1/1 |
| 7,149,737 B1* | 12/2006 | Luo et al. | 707/704 |
| 7,289,992 B2 | 10/2007 | Walker | 707/8 |
| 7,496,574 B2 | 2/2009 | Walker | 707/8 |
| 7,506,313 B2 | 3/2009 | Bates et al. | 717/125 |
| 8,126,911 B2* | 2/2012 | Hu et al. | 707/776 |
| 8,181,065 B2* | 5/2012 | Fachan et al. | 714/15 |
| 8,332,374 B2* | 12/2012 | Lev et al. | 707/704 |
| 2003/0014394 A1 | 1/2003 | Fujiwara | |
| 2004/0054643 A1* | 3/2004 | Vemuri et al. | 707/1 |
| 2004/0064439 A1* | 4/2004 | Hinshaw et al. | 707/1 |
| 2004/0068501 A1* | 4/2004 | McGoveran | 707/8 |
| 2004/0220933 A1* | 11/2004 | Walker | 707/8 |
| 2004/0221079 A1* | 11/2004 | Goldick | 710/200 |
| 2004/0230903 A1 | 11/2004 | Elza et al. | 715/513 |
| 2005/0044092 A1 | 2/2005 | Adya et al. | 707/100 |
| 2005/0060559 A1 | 3/2005 | McKenney | |
| 2005/0234902 A1 | 10/2005 | Meredith et al. | 707/4 |
| 2006/0064554 A1* | 3/2006 | Fridella et al. | 711/152 |
| 2006/0149739 A1 | 7/2006 | Myers | 707/9 |
| 2006/0167921 A1 | 7/2006 | Grebus et al. | 707/102 |
| 2006/0271395 A1* | 11/2006 | Harris et al. | 705/1 |
| 2006/0271396 A1 | 11/2006 | Lee et al. | |
| 2007/0088928 A1* | 4/2007 | Thangaraj et al. | 711/163 |
| 2007/0143398 A1 | 6/2007 | Graham | 709/204 |
| 2007/0168292 A1 | 7/2007 | Jogand-Coulomb et al. | 705/52 |
| 2007/0186056 A1 | 8/2007 | Saha et al. | 711/144 |
| 2007/0186069 A1 | 8/2007 | Moir | 711/162 |
| 2007/0233683 A1* | 10/2007 | Verma et al. | 707/8 |
| 2007/0239915 A1 | 10/2007 | Saha et al. | 710/200 |
| 2008/0178169 A1 | 7/2008 | Grossner et al. | 717/170 |
| 2008/0263549 A1 | 10/2008 | Walker | 718/100 |

OTHER PUBLICATIONS

Herlihy, et al., "Transactional Memory:Architectural Support for Lock-Free Data Structures", pp. 1-12. May 1993.

Shaughnessy, Managed Code Database Advantage for the Microsoft .NET Framework Platform, Date: Sep. 11, 2004-Sep. 15, 2004, http://bdn1.borland.com/borcon2004/article/paper/0,1963,32236,00.html.

Guerraoui, "Polymorphic Contention Management", Jan. 1, 2005.

Iyer, "Scheme to Route Transaction Groups in Multi-System Data Sharing", May 1, 1987.

Saha, "Architectural Support for Software Transactional Memory", 39th Annual IEEE/ACM International Symposium on Microarchitecture. Dec. 1, 2006.

Banatre, "A Fault Tolerant Tightly Coupled Multiprocessor Architecture based on Stable Transational Memory", Mar. 1990.

European Partial Search Report, Ref. EP67734RK900kja, for Application No. 08771364.0-2211 / 2176763 PCT/US2008067343, Nov. 4, 2011.

PCT International Search Report and Written Opinion for Application No. PCT/US2008/067343, Jan. 19. 2009.

JP Notice of Rejection for Application No. 2010-514980, Jan. 25, 2013.

CN Notice on the Third Office Action for Application No. 200880020189.3, Feb. 4, 2013.

\* cited by examiner

MEMORY TRANSACTION GROUPING

RELATED APPLICATION(S)

This application is a continuation of, and claims benefit from, U.S. application Ser. No. 11/824,379, filed Jun. 29, 2007, which is incorporated by reference in its entirety.

BACKGROUND

Steadily over time computers have become much more powerful, with more processing power and memory to handle advanced operations. This trend has recently shifted away from a focus on ever-increasing single-processor clock rates and towards an increase in the number of processors available in a single computer. Software developers want to take advantage of improvements in computer processing power, enabling their software programs to be executed faster as new hardware is adopted. With the new hardware trends, however, this requires a different approach: developers must arrange for one or more tasks of a particular software program to be executed "concurrently" (sometimes called "in parallel"), so that the same logical operation can utilize many processors at one time, and deliver better performance as more processors are added to the computers on which such software runs.

Transactional memory is designed to ease development of concurrent programs by providing atomicity and isolation to regions of program code. Transactional memory (TM) is a concurrency control mechanism analogous to database transactions for controlling access to shared memory in concurrent computing. A transaction in the context of transactional memory is a piece of code that executes a series of reads and writes to shared memory. TM is used as an alternative to traditional locking mechanisms. TM allows concurrent programs to be written more simply. A transaction specifies a sequence of code that is supposed to execute as if it were executing in isolation, whereas in reality it executes in a normal multithreaded environment with many concurrent activities. This illusion of isolation may be achieved by fine-grained locking of objects or memory ranges, and by executing in a mode that allows the effects of the transaction to be rolled back if the transaction is discovered to be in conflict with some other transaction. We say that a data access is "transacted" if the access is protected by these locking and rollback mechanisms.

Different locking and versioning mechanisms are possible, including several software-based and hardware-based approaches. Different mechanisms have features and qualities making each suitable or preferable in different situations. Combining different mechanisms within a single process generally is not possible, leading to the selection of generic mechanisms which typically compromise on performance in order to achieve general applicability.

SUMMARY

Various technologies and techniques are disclosed for providing a transaction grouping feature for use in programs operating under a transactional memory system. The transaction grouping feature is operable to allow transaction groups to be created that contain related transactions. The transaction groups are used to enhance operation of the programs. Transaction groups are defined such that the transactions in each group are known to operate on disjoint data, which enables incompatible locking and versioning mechanisms within each such group, in turn allowing fine-tuning of the specific mechanisms for each particular group.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The technologies and techniques herein may be described in the general context as a transactional memory system, but the technologies and techniques also serve other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a transaction grouping feature is provided for use in programs operating under a transactional memory system. The transaction grouping feature allows transactions to be placed into groups. If it can be determined that a set of transactions access data (e.g. read/write data) which is demonstrably disjoint from the data accessed by any other transactions, then this set can be considered as a "transaction group".

By the above definition, transactions that are part of a group are known to operate on read/write data which is disjoint from the read/write data accessed by other transactions within other groups. As a result, it becomes possible to implement distinct locking and versioning mechanisms for each such group, allowing each transaction group to leverage specially-selected locking and versioning algorithms most appropriate for the data accessed by the transactions in the group.

In addition to the particular data accessed by the transactions in a group, many other factors can influence the particular selection of locking and versioning algorithms used within a group. For example, the duration of the transactions or the nature of the code within the transactions are two other such factors. In one implementation, locking and versioning mechanisms that are normally incompatible can be used concurrently within a process, leading to potentially increased performance.

Determining when transactions can be grouped can be accomplished through a plurality of means. One implementation may leverage programmer-supplied annotations to demark the groups, as described in FIG. 4. Another implementation may use compiler heuristics to automatically infer groups and group membership, as described in FIG. 5. Still another implementation may use a runtime environment to dynamically and automatically infer groups and group membership, as described in FIG. 6. It should be appreciated that the specific mechanisms involved in creating groups and assigning group membership are many and can be combined in various ways.

Figure 1:
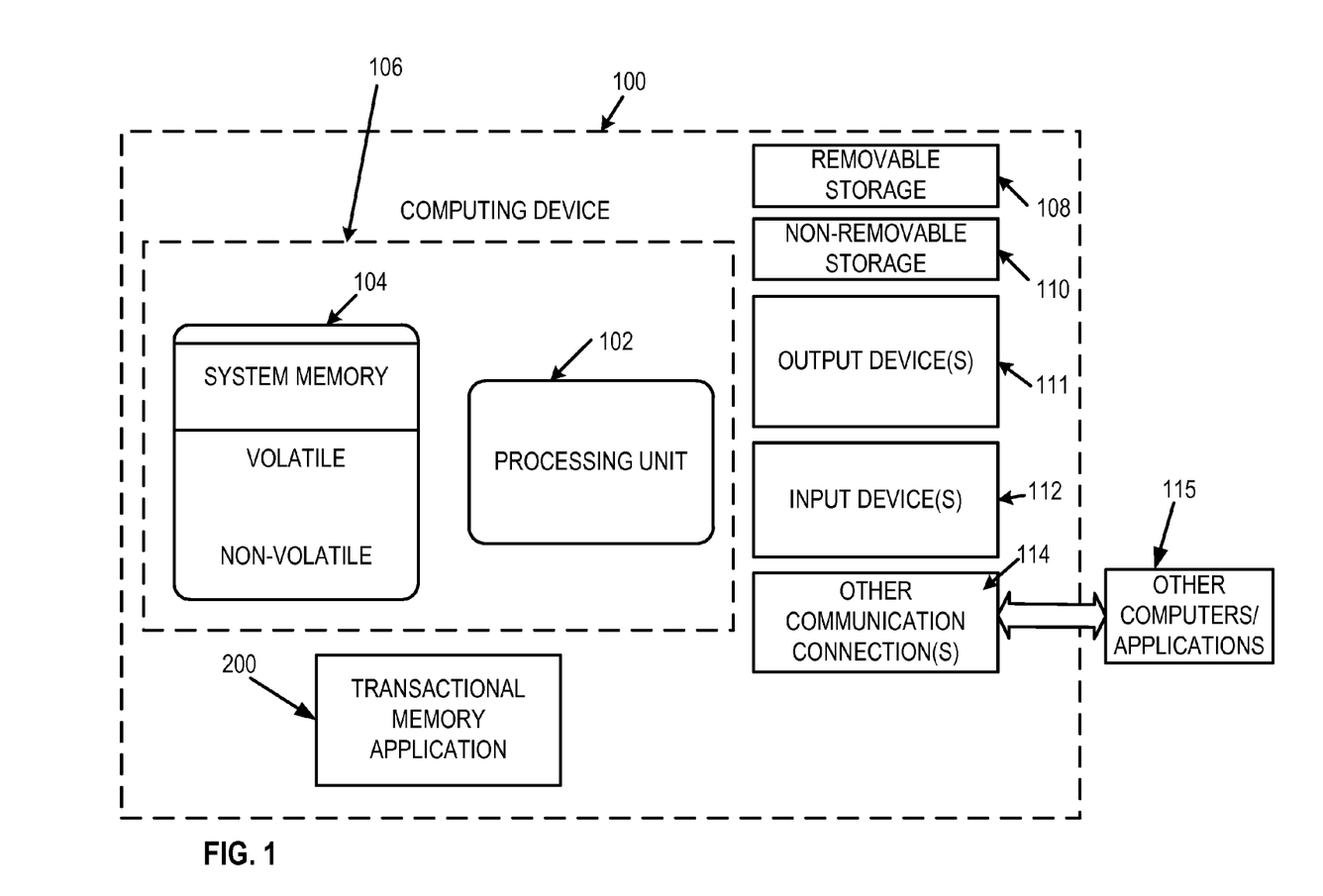
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100. The term "computer storage medium" and the like as used herein refer to a statutory article of manufacture that is not a signal or carrier wave per se.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
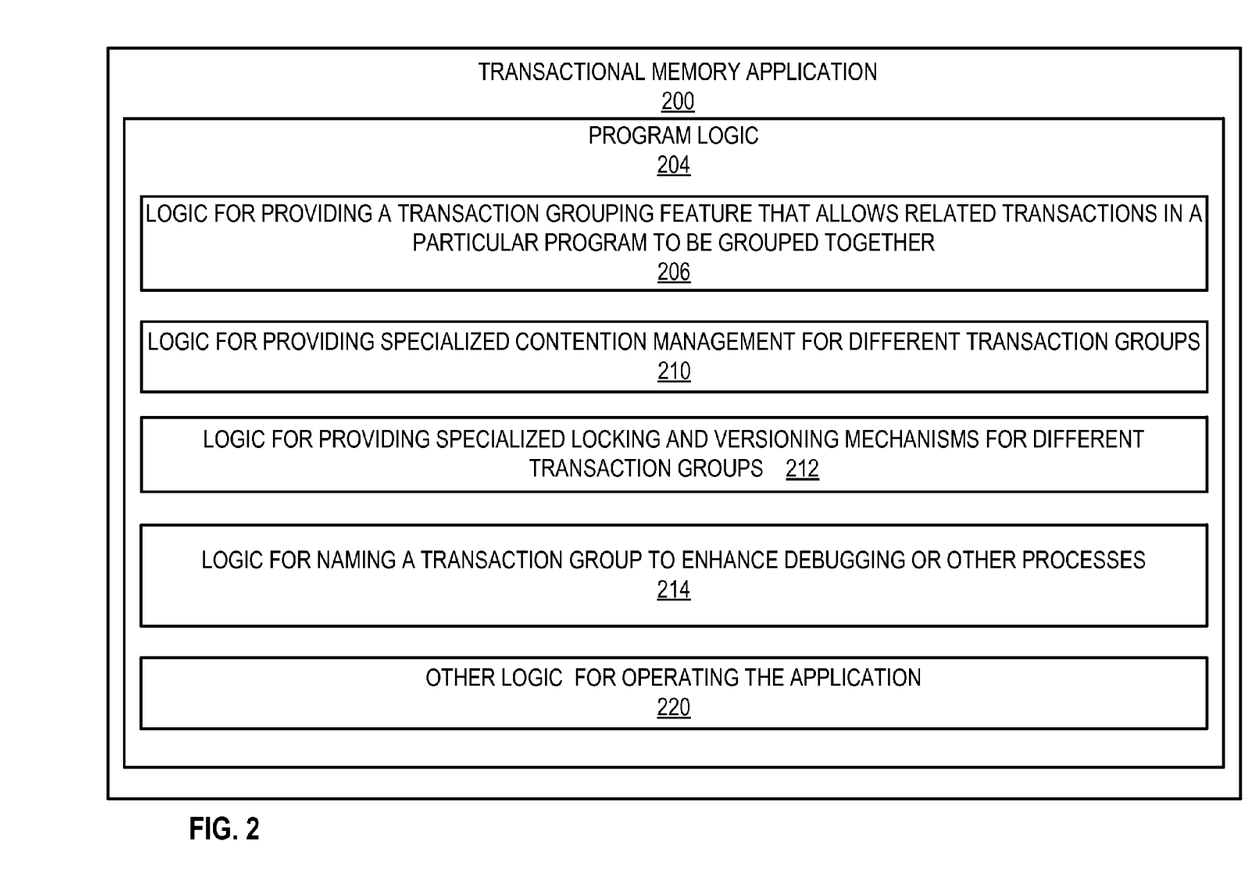
FIG. 2 is a diagrammatic view of a transactional memory application of one implementation operating on the computer system of FIG. 1.

Turning now to FIG. 2 with continued reference to FIG. 1, a transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for providing a transaction grouping feature that allows related transactions in a particular program to be grouped together 206 (as described below with respect to FIGS. 3-6); logic for providing specialized contention management using transaction groups 210 (as described below with respect to FIG. 7); logic for providing different locking and versioning mechanisms for different transaction groups 212 (as described below with respect to FIG. 8); logic for naming a transaction group to enhance debugging or other processes 214 (as described below with respect to FIG. 9); and other logic for operating the transactional memory application 220.

Figure 3:
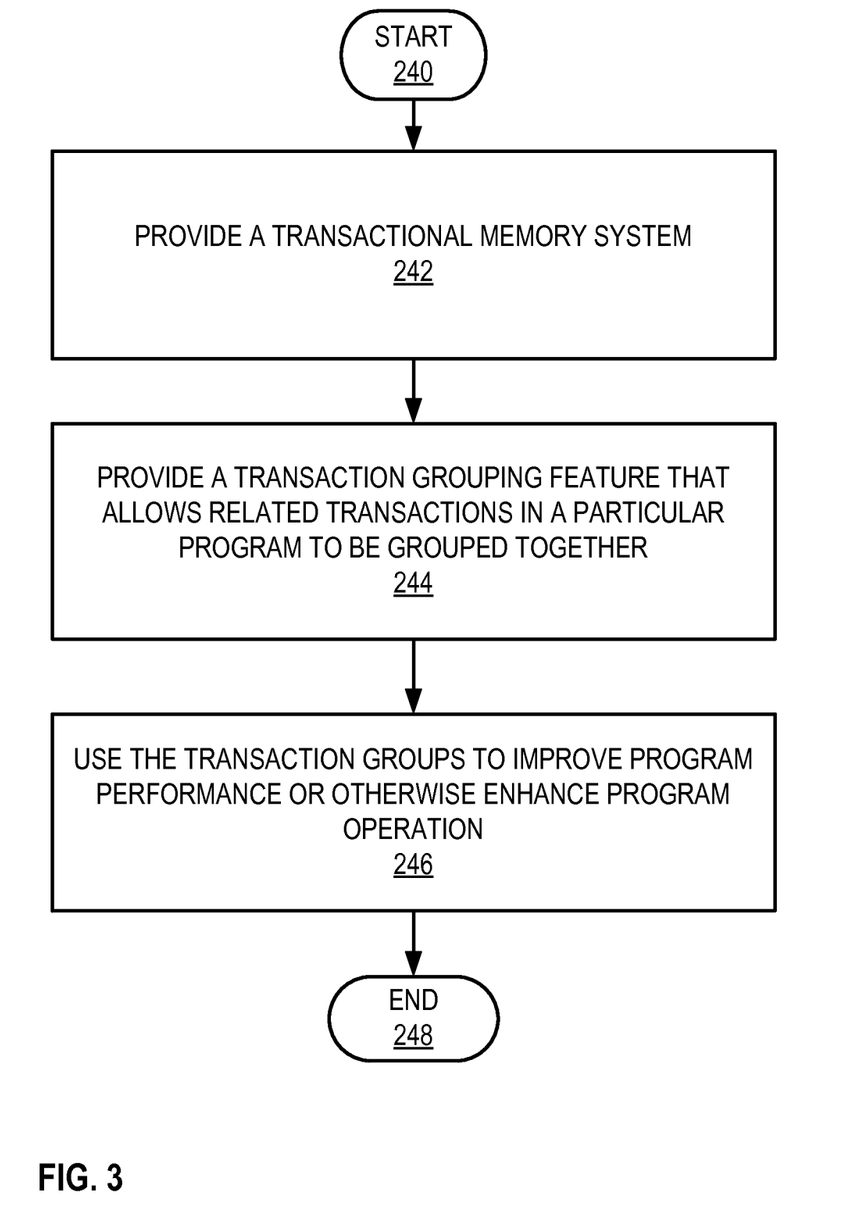
FIG. 3 is a high-level process flow diagram for one implementation of the system of FIG. 1.

Turning now to FIGS. 3-10 with continued reference to FIGS. 1-2, the stages for implementing one or more implementations of transactional memory application 200 are described in further detail. In some implementations, the processes of FIGS. 3-10 are at least partially implemented in the operating logic of computing device 100. FIG. 3 is a high level process flow diagram for transactional memory application 200. The process begins at start point 240 with providing a transactional memory system using software, hardware, and/or combinations thereof (stage 242). The system provides a transaction grouping feature that allows related transactions in a particular program to be grouped together either manually (as described in FIG. 4), and/or programmatically (as described in FIGS. 5 and 6) (stage 244). The system uses the transaction groups to improve program performance or otherwise enhance program operation, as described in FIGS. 7-10 (stage 246). The process ends at end point 248.

Figure 4:
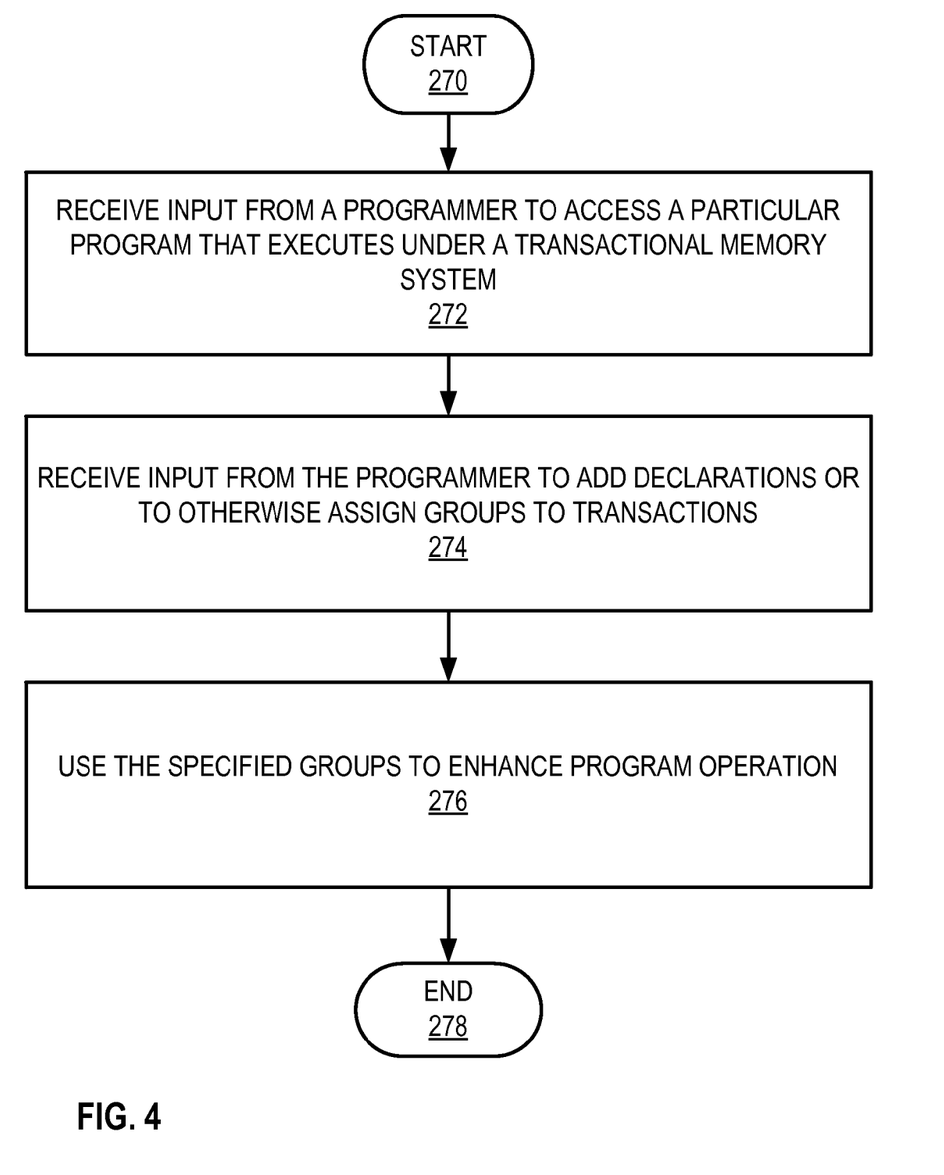
FIG. 4 is a process flow diagram for one implementation of the system of FIG. 1 illustrating the stages involved in allowing a programmer to group transactions.

FIG. 4 illustrates one implementation of the stages involved in allowing a programmer to group transactions. The process begins at start point 270 with receiving input from a programmer to access the source code of a particular program that executes under a transactional memory system (stage 272). The programmer adds declarations or otherwise assigns groups to transactions (stage 274). The system uses the specified groups to enhance program operation, as described in further detail in FIGS. 7-9 (stage 276). The process ends at end point 278.

Figure 5:
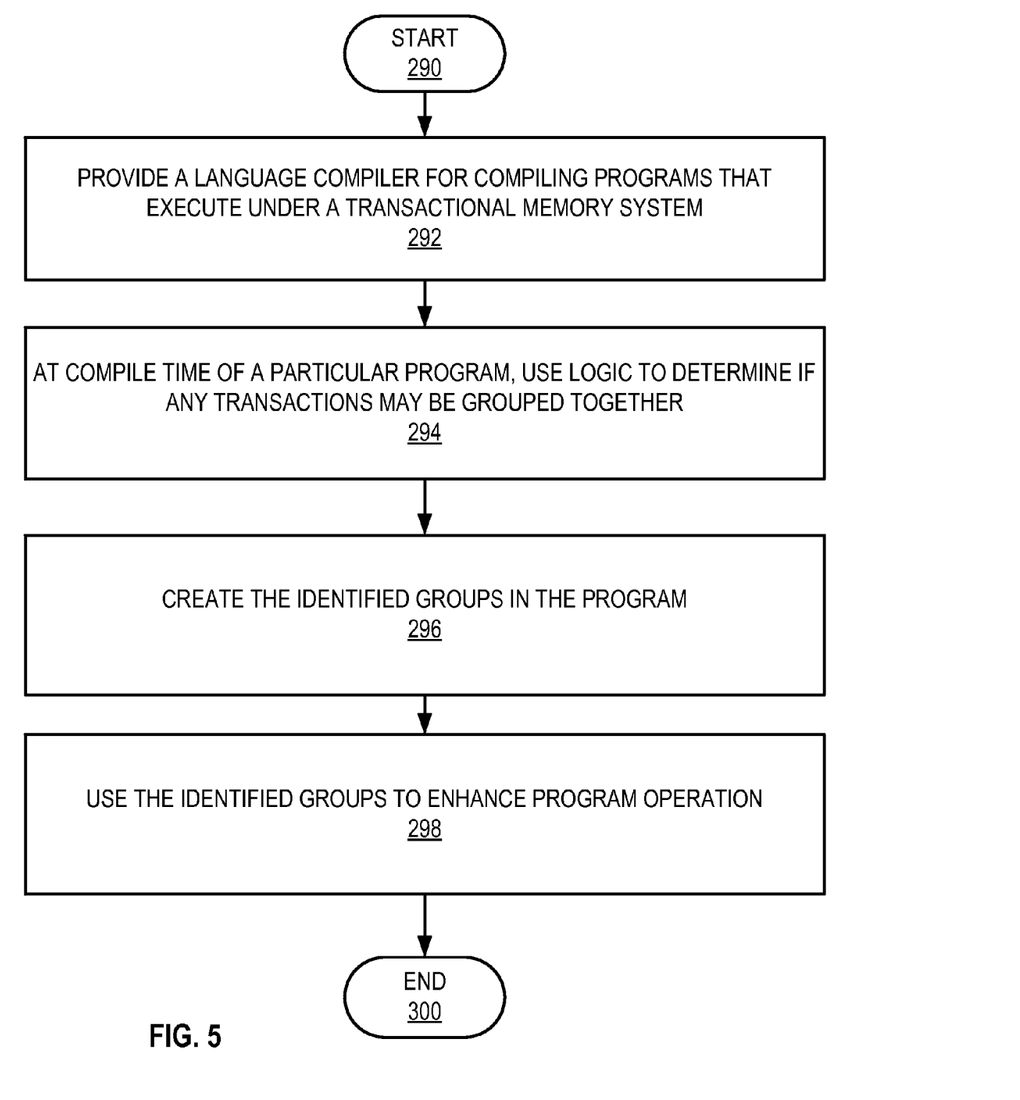
FIG. 5 is a process flow diagram for one implementation of the system of FIG. 1 illustrating the stages involved in providing a language compiler that automatically groups transactions based on specific heuristics.

FIG. 5 illustrates one implementation of the stages involved in providing a language compiler that automatically groups transactions. The process begins at start point 290 with providing a language compiler for compiling programs that execute under a transactional memory system (stage 292). At compile time of a particular program, logic is used to determine if any transactions may be grouped together (stage 294). As a few non-limiting examples, transactions may be grouped together by a compiler by leveraging the particular semantics of the programming language or through global analysis that demonstrates that groups are possible. The system creates the identified groups in the program (stage 296) and then uses the specified groups to enhance the program operation (stage 298). The process ends at end point 300.

Figure 6:
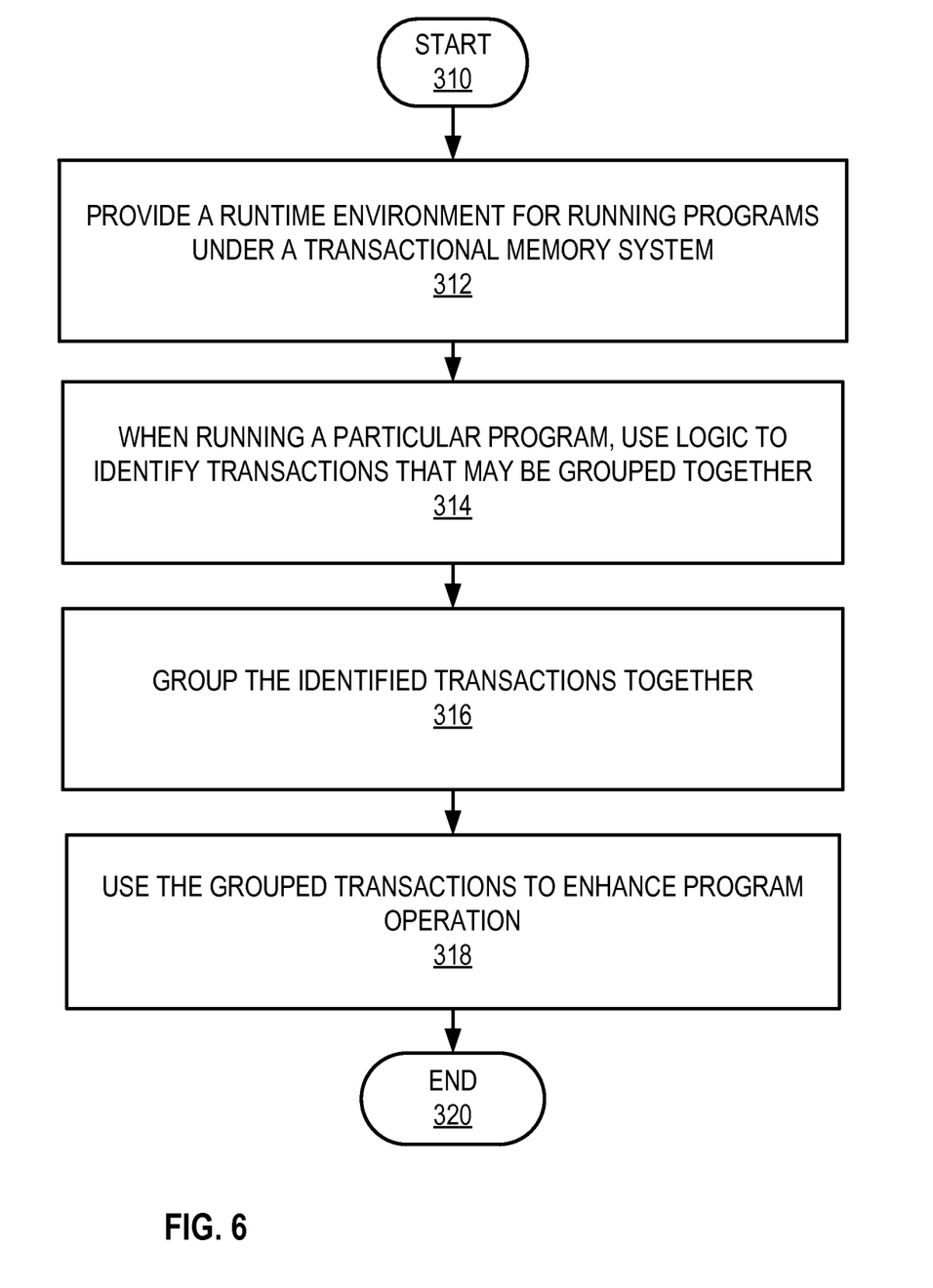
FIG. 6 is a process flow diagram for one implementation of the system of FIG. 1 illustrating the stages involved in providing a runtime environment that automatically groups transactions.

FIG. 6 illustrates one implementation of the stages involved in providing a runtime environment that groups transactions. The process begins at start point 310 with providing a runtime environment for running programs under a transactional memory system (stage 312). When running a particular program, logic is used to identify transactions that should be grouped together (stage 314). As a few non-limiting examples, transactions may be grouped together by a runtime environment by identifying sets of transactions which must by construction operate on disjoint read/write data. The runtime may operate on hints supplied by the compiler to hone its analysis process. The runtime groups the identified transactions together (stage 316) and uses the grouped transactions to improve operation of the particular program (stage 318). The process ends at end point 320.

Figure 7:
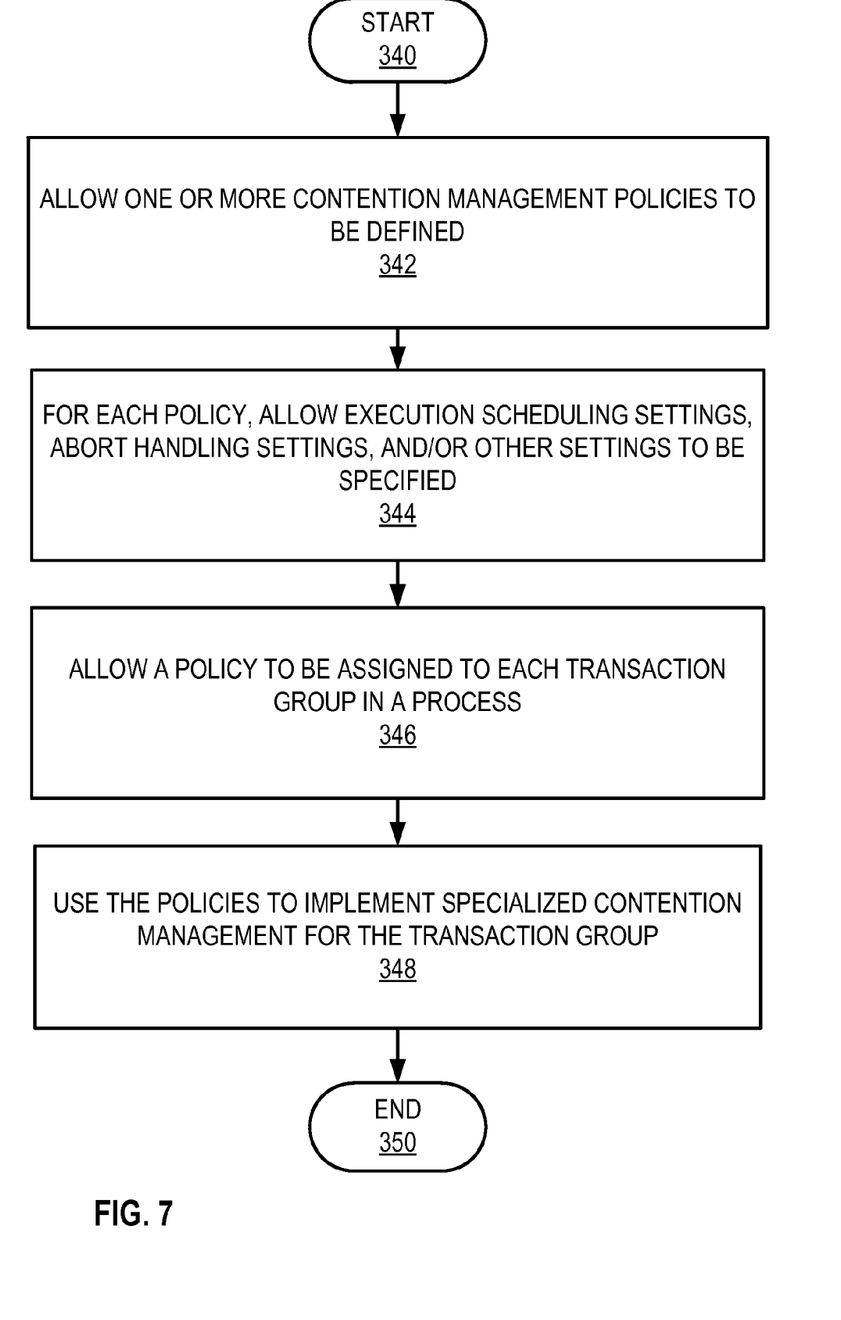
FIG. 7 is a process flow diagram for one implementation of the system of FIG. 1 that illustrates the stages involved in providing specialized contention management for different transaction groups.
Figure 8:
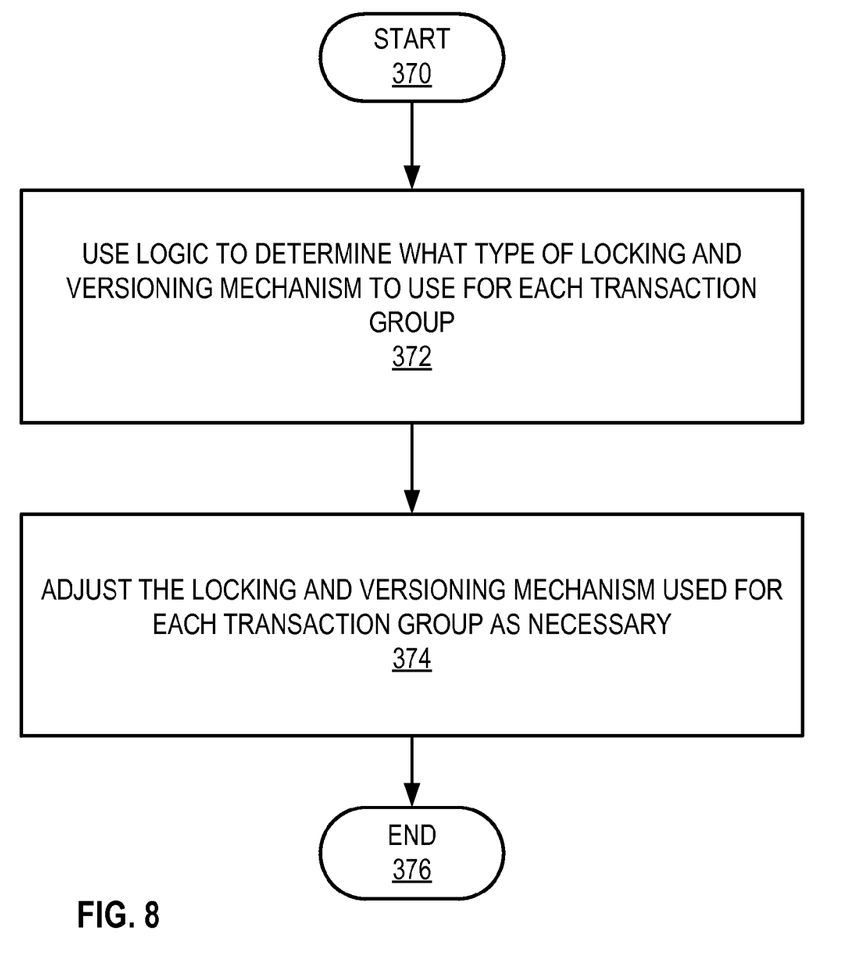
FIG. 8 is a process flow diagram for one implementation of the system of FIG. 1 that illustrates the stages involved in providing specialized locking and versioning mechanisms for different transaction groups.
Figure 9:
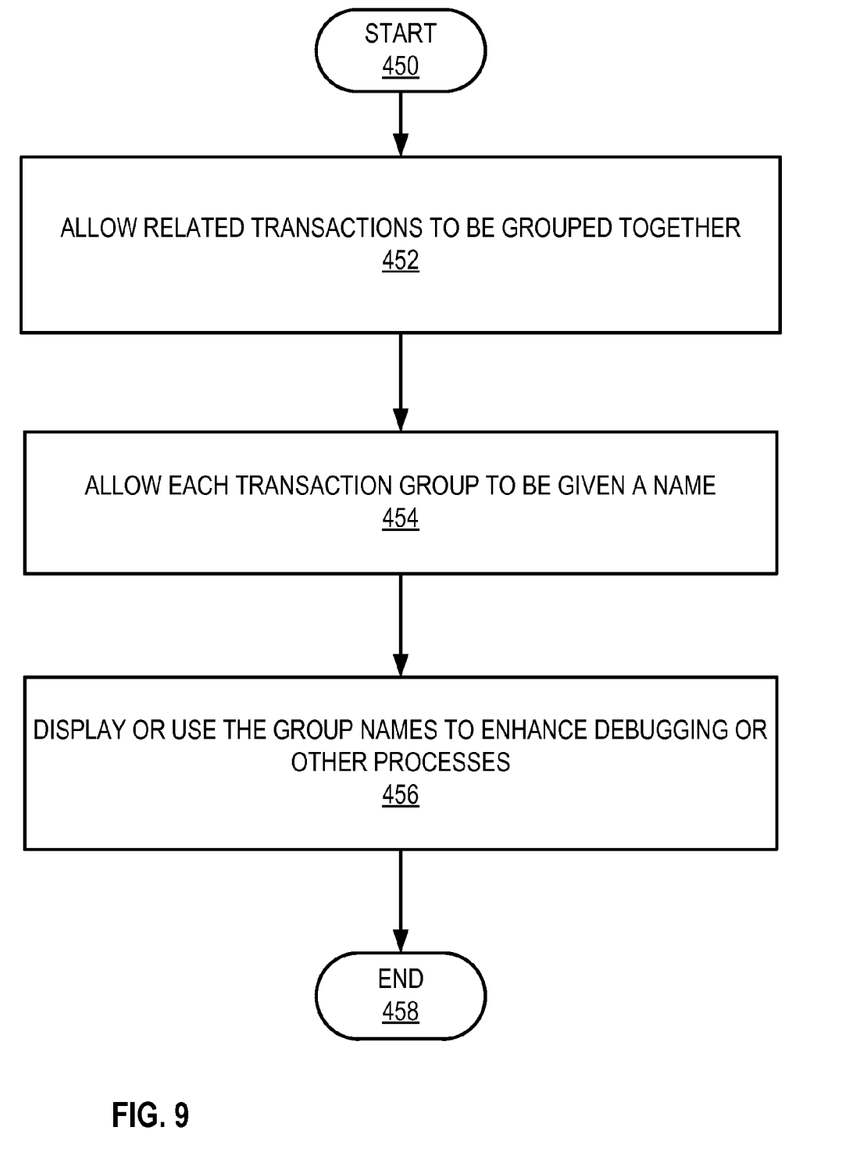
FIG. 9 is a process flow diagram for one implementation of the system of FIG. 1 that illustrates the stages involved in naming a grouping of related transactions to enhance debugging or other processes.

Turning now to FIGS. 7-9, examples will be used to describe how program operation can be enhanced using grouped transactions. FIG. 7 illustrates one implementation of the stages involved in providing specialized contention management using grouped transactions. The process begins at start point 340 with allowing one or more specialized contention management policies to be defined by a programmer (stage 342). For each policy, the system allows transaction execution scheduling settings, transaction abort handling settings, and/or other settings to be specified (stage 344). The previously defined policy can then be assigned to each transaction group in a process (stage 346). The system uses the policies to implement specialized contention management for the grouped transactions (stage 348).

Contention management is the mechanism used by a runtime system to select appropriate behavior whenever a conflict is detected between multiple concurrently executing transactions. Contention management decides which of the conflicting transactions, if any, to preserve and which to abort. It further decides how to reschedule execution of the individual transactions such that they can run to completion. Specialized contention management as used herein refers to the ability to apply contention management heuristics which are distinct from the default heuristics of a given runtime.

In one implementation, by applying different policies to different groups, enhanced performance of the program can be achieved. For example, one type of specialized contention management policy can be assigned to a particular transaction group that will give the best performance for the types of operations those transactions contain. Another specialized contention management policy can be assigned to another transaction group that will get the best performance for the types of operations that the other transaction group contains. The process ends at end point 350.

FIG. 8 illustrates one implementation of the stages involved in providing different locking and versioning mechanisms for different groups of transactions. The process begins at start point 370. The system uses logic to determine what type of locking and versioning to use for each transaction group (stage 372) and then adjusts the locking and versioning used on each transaction group as necessary (stage 374). The process ends at end point 376.

As an example, one transactional memory locking and versioning mechanism can be used with one particular transaction group while another potentially incompatible transactional memory locking and versioning mechanism is used with another transaction group.

Let's look at a non-limiting example to further illustrate how different transactional memory mechanisms can be combined together when there are multiple transaction groups. One transaction group could use a buffered update scheme for versioning, while another group could use an in-place update scheme with undo logging. By grouping transactions, the data can be isolated in ways that enable the combinations of such incompatible transactional memory locking and versioning mechanisms to be used, which may enable improved overall performance. As another example, fast but limited hardware-based transactional memory mechanisms can be used in some transaction groups, while incompatible and slower software transactional memory mechanisms can be used in other transaction groups when the hardware limitations are not acceptable for the transactions of the group.

While the previous hypothetical example just mentioned using this technique with two transaction groups, the concept can be used with more than two groups and with various combinations of transactional memory locking and versioning mechanisms, including both hardware and software approaches FIG. 9 illustrates one implementation of the stages involved in naming a grouping of related transactions to enhance debugging or other processes. The process begins at start point 450 with allowing related transaction to be grouped together by a user and/or programmatically (stage 452). A naming feature is provided that allows each transaction group to be given a name by a user and/or programmatically (stage 454). The system then displays or uses the group names to enhance debugging, profiling, or other processes (stage 456). For example, the group names can be displayed in a debugger or profiler to allow a user to more easily identify the particular transaction group. The process ends at end point 458.

Figure 10:
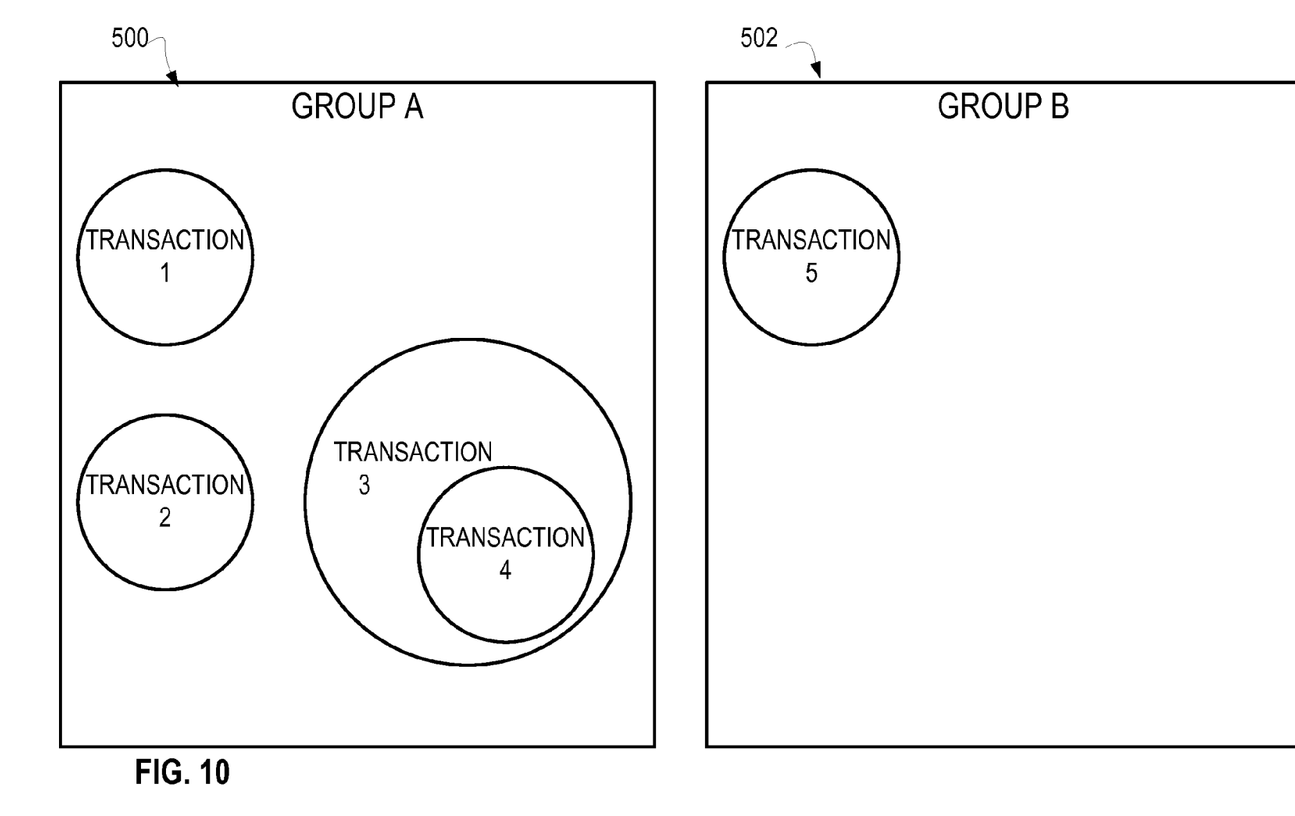
FIG. 10 is a diagrammatic view of multiple transaction groups.

FIG. 10 is a diagrammatic view of multiple transaction groups. In the example shown, a first transaction group 500 contains four transactions, one of which is nested within the other. The second transaction group 502 just contains a single transaction. Numerous other transactional grouping scenarios are also possible that contain a different number of transaction groups and/or a different number of transactions within each group.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

The invention claimed is:

1. A method for a first transaction and a second transaction to concurrently access shared memory that includes first data and second data, the method comprising:
  grouping the first transaction into a first transaction group, where a first policy is assigned to the first transaction group;
  grouping the second transaction into a second transaction group, where a second policy is assigned to the second transaction group, and where the first policy and the second policy comprise transaction execution scheduling settings or transaction abort handling settings;

executing, by a computer, the first transaction within a process, the executing first transaction accessing the first data that is protected by a first locking mechanism; and executing, by the computer concurrently with the executing first transaction, the second transaction within the process, the executing second transaction accessing the second data that is protected by a second locking mechanism that is incompatible with the first locking mechanism, and where the groupings provide for the executing second transaction accessing the second data concurrently with the executing first transaction accessing the first data given that the second locking mechanism is incompatible with the first locking mechanism.

2. The method of claim 1 wherein the first data and the second data are disjoint.

3. The method of claim 1 wherein any transaction in the first transaction group is compatible with the first locking mechanism and incompatible with the second locking mechanism.

4. The method of claim 1 wherein any transaction in the second transaction group is compatible with the second locking mechanism and incompatible with the first locking mechanism.

5. At least one computer storage device that is not a signal per se, that stores computer-executable instructions that, when executed by a computer, cause the computer to perform actions for causing a first transaction and a second transaction to concurrently access shared memory that includes first data and second data, the actions comprising:

grouping the first transaction into a first transaction group, where a first policy is assigned to the first transaction group;

grouping the second transaction into a second transaction group, where a second policy is assigned to the second transaction group, and where the first policy and the second policy comprise transaction execution scheduling settings or transaction abort handling settings;

executing the first transaction within a process, the executing first transaction accessing the first data that is protected by a first locking mechanism; and executing, concurrently with the executing first transaction, the second transaction within the process, the executing second transaction accessing the second data that is protected by a second locking mechanism that is incompatible with the first locking mechanism, and where the groupings provide for the executing second transaction accessing the second data concurrently with the executing first transaction accessing the first data given that the second locking mechanism is incompatible with the first locking mechanism.

6. The at least one computer storage device of claim 5 wherein the first data and the second data are disjoint.

7. The at least one computer storage device of claim 5 wherein any transaction in the first transaction group is compatible with the first locking mechanism.

8. The at least one computer storage device of claim 5 wherein any transaction in the second transaction group is compatible with the second locking mechanism.

9. A system configured for enabling a first transaction and a second transaction to concurrently access shared memory that includes first data and second data, the system comprising:

a computer configured for grouping the first transaction into a first transaction group, where a first policy is assigned to the first transaction group;

the computer further configured for grouping the second transaction into a second transaction group, where a second policy is assigned to the second transaction group, and where the first policy and the second policy comprise transaction execution scheduling settings or transaction abort handling settings;

the computer further configured for executing the first transaction within a process, the executing first transaction accessing the first data that is protected by a first locking mechanism; and the computer further configured for executing, concurrently with the executing first transaction, the second transaction within the process, the executing second transaction accessing the second data that is protected by a second locking mechanism that is incompatible with the first locking mechanism, and where the groupings provide for the executing second transaction accessing the second data concurrently with the executing first transaction accessing the first data given that the second locking mechanism is incompatible with the first locking mechanism.

10. The system of claim 9 wherein the first data and the second data are disjoint.

11. The system of claim 9 where any transaction in the first transaction group is compatible with the first locking mechanism, and any transaction in the second transaction group is compatible with the second locking mechanism.

* * * * *